(12) United States Patent
Strock

(10) Patent No.: US 10,774,669 B2
(45) Date of Patent: Sep. 15, 2020

(54) LOW PERMEABILITY HIGH PRESSURE COMPRESSOR ABRADABLE SEAL FOR BARE NI AIRFOILS HAVING CONTINUOUS METAL MATRIX

(71) Applicant: United Technologies Corporation, Farmington, CT (US)

(72) Inventor: Christopher W. Strock, Kennebunk, ME (US)

(73) Assignee: Raytheon Technologies Corporation, Farmington, CT (US)

( * ) Notice: Subject to any disclaimer, the term of this patent is extended or adjusted under 35 U.S.C. 154(b) by 135 days.

(21) Appl. No.: 16/170,476

(22) Filed: Oct. 25, 2018

(65) Prior Publication Data

US 2019/0063251 A1 Feb. 28, 2019

Related U.S. Application Data

(62) Division of application No. 14/689,492, filed on Apr. 17, 2015, now Pat. No. 10,145,258.

(60) Provisional application No. 61/983,590, filed on Apr. 24, 2014.

(51) Int. Cl.
| | | |
|---|---|---|
| *F01D 11/12* | (2006.01) | |
| *F16J 15/44* | (2006.01) | |
| *C23C 4/02* | (2006.01) | |
| *C23C 4/06* | (2016.01) | |
| *C23C 28/00* | (2006.01) | |

(Continued)

(52) U.S. Cl.
CPC .............. *F01D 11/122* (2013.01); *C23C 4/02* (2013.01); *C23C 4/06* (2013.01); *C23C 4/10* (2013.01); *C23C 28/34* (2013.01); *F01D 5/28* (2013.01); *F01D 5/284* (2013.01); *F01D 5/286* (2013.01); *F01D 5/288* (2013.01); *F01D 11/127* (2013.01); *F16J 15/444* (2013.01); *F05D 2230/30* (2013.01); *F05D 2230/312* (2013.01); *F05D 2230/42* (2013.01); *F05D 2230/90* (2013.01); *F05D 2240/11* (2013.01); *F05D 2260/95* (2013.01); *F05D 2300/2282* (2013.01)

(58) Field of Classification Search
CPC .......... F01D 5/286; F01D 5/288; F01D 5/284; F01D 5/28; F01D 11/122; F01D 11/127; F16J 15/444; C23C 4/02; C23C 4/06; C23C 4/10; C23C 28/34; F05D 2230/30; F05D 2230/312; F05D 2230/90; F05D 2230/42; F05D 2260/95; F05D 2240/11; F05D 2300/2282
See application file for complete search history.

(56) References Cited

U.S. PATENT DOCUMENTS

| | | |
|---|---|---|
| 4,735,656 A | 4/1988 | Schaefer et al. |
| 5,049,450 A * | 9/1991 | Dorfman ................... C23C 4/06 |
| | | 428/570 |

(Continued)

FOREIGN PATENT DOCUMENTS

JP 2003-64463 A 3/2003

*Primary Examiner* — Brian P Wolcott
(74) *Attorney, Agent, or Firm* — Bachman & LaPointe, P.C.

(57) ABSTRACT

An air seal in a gas turbine engine comprising a substrate. A bond coating layer is adhered to the substrate. An abradable layer is adhered to the bond coating layer. The abradable layer comprises a metal matrix discontinuously filled with a soft ceramic material.

8 Claims, 2 Drawing Sheets

(51) Int. Cl.
F01D 5/28 (2006.01)
C23C 4/10 (2016.01)

(56) References Cited

U.S. PATENT DOCUMENTS

| | | | | |
|---|---|---|---|---|
| 5,506,055 A * | 4/1996 | Dorfman | .................... | C23C 4/06 |
| | | | | 428/407 |
| 5,976,695 A * | 11/1999 | Hajmrle | .............. | C22C 32/0089 |
| | | | | 428/402 |
| 6,541,075 B2 * | 4/2003 | Hasz | ..................... | C22C 38/005 |
| | | | | 228/121 |
| 6,808,756 B2 | 10/2004 | Hajmrle et al. | | |
| 6,887,530 B2 * | 5/2005 | Fiala | ....................... | B22F 3/115 |
| | | | | 427/456 |
| 7,763,573 B2 * | 7/2010 | Hajmrle | ................ | C04B 35/583 |
| | | | | 508/103 |
| 8,592,291 B2 * | 11/2013 | Shi | ........................ | C23C 16/342 |
| | | | | 257/E21.17 |
| 8,777,562 B2 * | 7/2014 | Strock | ................... | C23C 28/347 |
| | | | | 415/173.1 |
| 9,896,756 B2 * | 2/2018 | Beaudion | .............. | F01D 11/125 |
| 10,590,523 B2 * | 3/2020 | Beaudoin | ................ | C23C 4/134 |
| 2004/0137259 A1 | 7/2004 | Pabla et al. | | |
| 2010/0119706 A1 * | 5/2010 | Werner | .................... | C23C 10/28 |
| | | | | 427/180 |
| 2011/0243716 A1 * | 10/2011 | Strock | ..................... | F01D 11/12 |
| | | | | 415/173.4 |
| 2013/0071235 A1 * | 3/2013 | Strock | ................... | F01D 11/122 |
| | | | | 415/174.4 |
| 2013/0078085 A1 | 3/2013 | Strock et al. | | |
| 2016/0333717 A1 * | 11/2016 | Strock | .................... | F01D 5/282 |
| 2019/0120075 A1 * | 4/2019 | Strock | .................... | B22F 5/009 |

* cited by examiner

LOW PERMEABILITY HIGH PRESSURE COMPRESSOR ABRADABLE SEAL FOR BARE NI AIRFOILS HAVING CONTINUOUS METAL MATRIX

CROSS-REFERENCE TO RELATED APPLICATIONS

This application is a divisional application of U.S. patent application Ser. No. 14/689,492 which claims the benefit of U.S. Patent Application Ser. No. 61/983,590, filed Apr. 24, 2014.

BACKGROUND

The disclosure relates to an air seal for a gas turbine engine.

In compressor and turbine sections of a gas turbine engine, air seals are used to seal the interface between rotating structure, such as a hub or a blade, and fixed structure, such as a housing or a stator. For example, typically, circumferentially arranged blade seal segments are fastened to a housing, for example, to provide the seal.

Relatively rotating components of a gas turbine engine are not perfectly cylindrical or coaxial with one another during engine operation. As a result, the relatively rotating components may occasionally rub against one another. To this end, an abradable material typically is adhered to the blade seal segments or full rings and/or the rotating component.

Abradable seals in the compressor section of gas turbine engines include characteristics such as, good abradability, spall resistance, and erosion resistance. Abradable seals are required to exhibit a smooth surface, low gas permeability, and environmental durability. The seal is a sacrificial element in order to minimize blade wear, so it is abradable. The seal must also minimize gas flow leakage through the seal, so a low gas permeability is desirable.

Abradable coatings for the seals are always a compromise between abradability and erosion resistance. In order to maintain blade tip clearances over time, the seal material needs to be tough and resistant to erosion. Conventional seal materials tend to be soft and weak in order to have good abradability. However, current understanding of the wear mechanisms involved with high pressure compressor (HPC) abradable materials, while rubbed with bare Nickel (Ni) alloy blades, is that wear takes place by adhesive wear mechanisms, plastic deformation and fracture on a scale far smaller than the size of coating constituent particles. This becomes apparent when one considers that the wear per blade passage is on the order of 1E-6 inches.

The new understanding of the scale of wear particle removal provides insight that leads to an improved coating structure that minimizes volume fraction of the strong metal constituents while assembling them in a structure that maximizes their contribution to toughness and strength.

SUMMARY

In accordance with the present disclosure, there is provided a seal comprising an abradable layer, the abradable layer comprising a metal matrix discontinuously filled with soft ceramic material. The soft ceramic material comprises soft ceramic particles clad with a metallic alloy.

In another alternative embodiment an air seal in a gas turbine engine comprises a substrate. A bond coating layer is adhered to the substrate. An abradable layer is adhered to the bond coating layer. The abradable layer comprises a metal matrix discontinuously filled with hexagonal boron nitride clad with a metallic alloy.

In another and alternative embodiment, the substrate is metallic.

In another and alternative embodiment, the metal matrix is discontinuously filled with a hexagonal boron nitride or a hexagonal boron nitride agglomerate.

In another and alternative embodiment, the metal matrix is discontinuously filled with a soft phase material. The abradable layer includes a metal fraction of from about 10 V % to about 36 V %.

Further in accordance with the present disclosure, there is provided a gas turbine engine comprising a first structure and a second structure rotating relative to the first structure, wherein one of the first structure and second structure comprises a substrate. A bond coating layer is adhered to the substrate. An abradable layer is adhered to the bond coating layer. The abradable layer comprises a metal matrix discontinuously filled with hexagonal boron nitride clad with a metallic alloy.

In another and alternative embodiment, the substrate is an outer case, and the other rotating structure is a blade tip, wherein the blade tip is arranged adjacent the outer case without any intervening, separable seal structure.

Further in accordance with the present disclosure, there is provided a method of manufacturing a gas turbine engine air seal comprising depositing a bond coating onto a substrate. The method includes depositing an abradable coating onto the bond coating. The method includes cladding hexagonal boron nitride particles with a metallic alloy and consolidating the clad boron nitride particles.

In another and alternative embodiment, the method further comprises plasma spraying the abradable coating onto the bond coating.

In another and alternative embodiment, the method includes depositing the abradable coating onto a substrate and depositing includes at least one of hot pressing the abradable coating directly onto the substrate, as a pressed and sintered biscuit that is brazed on, glued, mechanically attached, attached by hot isostatic pressing, and sprayed directly onto the substrate.

In another alternative embodiment, the abradable coating further comprises metal clad hBN particles with additional metal matrix particles, metal particles of a different composition to the cladding, fugitive pore formers, and additional soft phase material in the composite powder. The fugitive pore formers may comprise at least one of a polyester particle and a Lucite particle. The additional soft phase material may comprise a bentonite agglomerated hBN, molybdenum disilicide, or a MAX phase ternary carbide or nitride.

In another alternative embodiment, the method includes adjusting the abradable coating properties during manufacture to target the properties required for a predetermined gas turbine engine section environment. This may be done in by adjusting the ratio of constituent materials (powders.) In an exemplary embodiment, the adjusting step further comprises adjusting a ratio of the clad hBN particles to at least one of the additional metal matrix particles, the fugitive pore formers, and the additional soft phase material in a composite powder.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
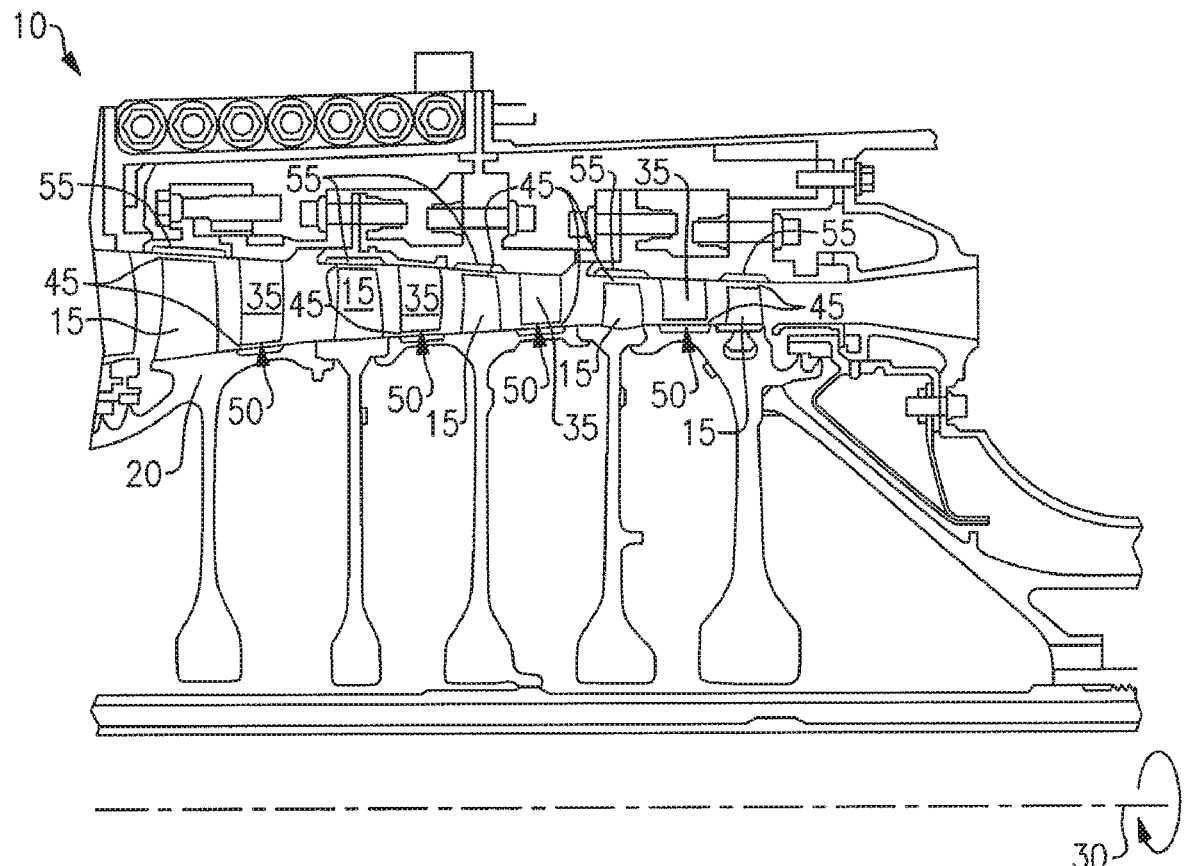
FIG. 1 shows a perspective view of a portion of a gas turbine engine incorporating an air seal.

FIG. 1 shows a portion of a gas turbine engine 10, for example, a high pressure compressor section. The engine 10 has blades 15 that are attached to a hub 20 that rotate about an axis 30. Stationary vanes 35 extend from an outer case or housing 40, which may be constructed from a nickel alloy, and are axially interspersed between stages of the turbine blades 15, which may be constructed from titanium in one example. A first gap 45 exists between the blades 15 and the outer case 40, and a second gap 50 exists between the vanes 35 and the hub 20.

Figure 2:
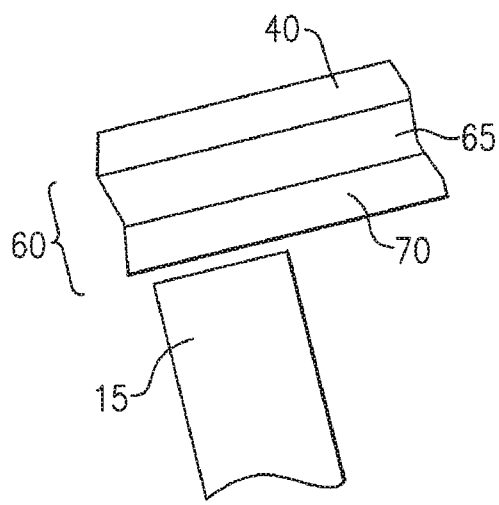
FIG. 2 shows a schematic view of an air seal.

Air seals 60 (FIG. 2) are positioned in at least one of the first and second gaps 45, 50. Further, the air seals 60 may be positioned on: (a) the outer edge of the blades 15; (b) the inner edge of the vanes 35; (c) an outer surface of the hub 30 opposite the vanes 35; and/or (d) as shown in FIG. 2, on the inner surface of outer case 40 opposite the blades 15. It is desirable that the gaps 45, 50 be minimized and interaction between the blades 15, vanes 35 and seals 60 occur to minimize air flow around blade tips or vane tips.

In one example shown in FIG. 2, the air seal 60 is integral with and supported by a substrate, in the example, the outer case 40. That is, the air seal 60 is deposited directly onto the outer case 40 without any intervening, separately supported seal structure, such as a typical blade outer air seal. The tip of the blade 5 is arranged in close, proximity to the air seal 60. It should be recognized that the seal provided herein may be used in any of a compressor, a fan or a turbine section and that the seal may be provided on rotating or non-rotating structure. The seal can also be for a turbine pump in a gas pipeline, a water or oil seal in a pump or other application.

The air seal 60 includes a bond coat 65 deposited onto the outer case 40. In an exemplary embodiment, the bond coat 65 may be a thermally sprayed bond coat. In another example, the bond coat 65 may comprise an alloy, such as PWA1365 MCrAlY composition applied by air plasma spray. In another exemplary embodiment, the bond coat 65 can be optional, if it is used, the bond coat 65 can be thermally sprayed, a braze material or a polymer adhesive. A composite topcoat 70 acts as an abradable layer that is deposited on the bond coat 65 opposite the outer case 40. In an exemplary embodiment, the metallic bond coat 65 may be replaced by an adhesive layer. The adhesive may be polyurethane in the front stages of the compressor or in the fan where ambient temperature is sufficiently low (e.g., less than about 300 degrees Fahrenheit.

Figure 3:
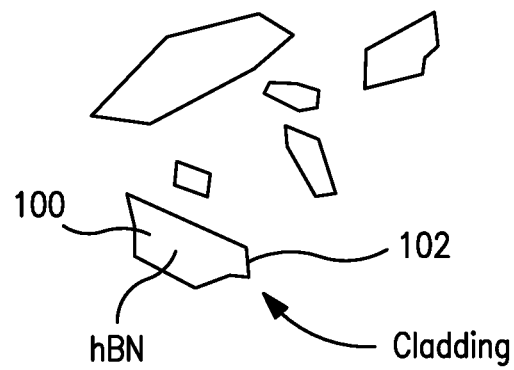
FIG. 3 shows a cross sectional view of a coating powder before being applied.
Figure 4:
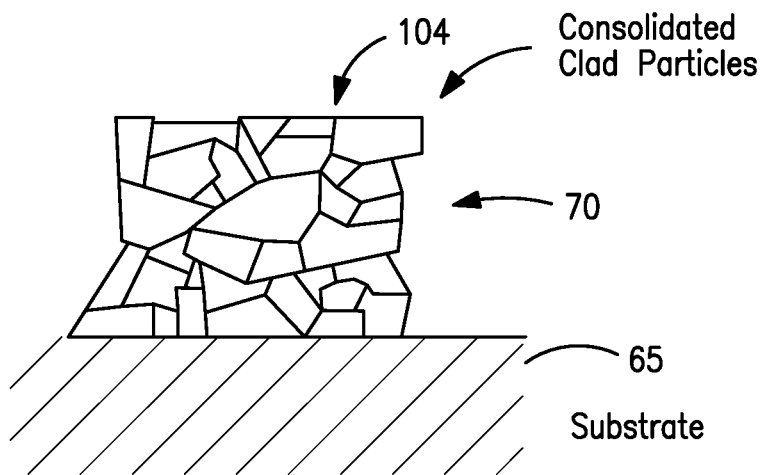
FIG. 4 shows a cross sectional view of a coating on a substrate.

Referring also to FIGS. 3 and 4, the composite abradable coating 70 consists of a material that is a single distribution of a hexagonal boron nitride ("hBN") 100 or soft ceramic material or other soft phase clad with a metallic-based alloy cladding 102 (such as a Ni based alloy, though others such as cobalt, copper and aluminum are also contemplated herein). Feed stock used to provide the air seal 60 abradable coating 70 is made of composite powder particles of Ni alloy and hBN in which the metal is plated onto the hBN in a chemical cladding process, the metal clad hBN particles are used at a variable ratio with additional metal particles, fugitive pore formers, such as polyester or Lucite particles or additional soft phase material (Such as bentonite agglomerated hBN) in the composite powder to adjust and target the coating properties during manufacture. In an exemplary embodiment, the additional metal particles may be the same composition as the plating or different. The additional particles can be alloying elements such as Al, Cr, Si, B which may serve as a processing aid or modify the matrix alloy to provide some desired property such as oxidation resistance. It may be desirable to add Cr and/or Al and the like, as separate particles. The composition of these particles may advantageously combine with the matrix metal to improve oxidation resistance or other property (by diffusion during heat treatment or in service. Other compounds such as a relatively soft (3 or less or preferably less than 2 on the Mohs hardness scale) ceramic like bentonite clay (e.g., a Montmorillonite) may be substituted for the hBN.

The matrix 102 of Ni based alloy may be coated upon the hBN 100 before thermal spraying. In an exemplary embodiment, the metal cladding may also be produced as discrete elemental layers in order to facilitate manufacturing as it is difficult to co-deposit multiple elements as an alloy in the cladding process.

The volume fraction of hBN in the composite coating 104 is about 50-80%. The target metal content of the coating may be around 50% by volume or less. In one example, a volume fraction of hBN in the range of 75-80% is used. The target metal fraction can be on the order of 10-36% by volume. Some porosity, 0.5 to 15 volume % is normal in thermal spray coatings depending on the process and material. A low volume fraction of fugitive may be desirable to further reduce density and rub forces without substantially affecting roughness and gas permeability (e.g., less than about 25 volume %).

An additional volume fraction may be porosity which is inherent to the thermal spray process or intentionally induced with spray parameter selection or the addition of a fugitive material. Example fugitive materials are polyester and Lucite powders. The low volume fraction of metal in combination with the hBN limits the ductility of a surface layer that forms by mechanical alloying due to plastic deformation as it is rubbed by an airfoil tip (or other rotating element) which results in good abradability. Low volume fraction of metal and poor bonding with the hBN also produces a low modulus composite that is somewhat flexible and compliant to part deformation and thermal expansion contributions to stress. The low modulus keeps stresses low.

It should be noted that the ductile matrix phase provides toughness, erosion resistance, spallation and cracking resistance while the selection of matrix and filler combine to provide specific properties of the mechanically alloyed surface layer in order to promote abradability. The hBN is particularly well suited to forming the low ductility surface layer because hBN does not bond well to the metal and when mixed into the metal weakens it, lowers the ductility and promotes the removal of wear particles from the surface.

The metal and hBN composite coating bonds with the bond coat 65 through mechanical interlocking with the rough surface of the thermally sprayed bond coat 65, which provides a durable, low stress abradable layer that will remain bonded to the bond coat 65 during engine service including rub events. The topcoat abradable layer 70 can be deposited through a variety of methods. In an exemplary embodiment, the abradable layer could be hot pressed directly onto the part, as a biscuit that is brazed on, glued or mechanically attached, attached by hot isostatic pressing, pressed and sintered, as well as sprayed directly onto the substrate or bond coat. The powders are deposited by a known thermal spray process, such as high velocity oxygen fuel spraying (HVOF), and air plasma spray (APS) or cold spray.

One or more embodiments have been described. Nevertheless, it will be understood that various modifications may be made. For example, the present disclosure seeks to provide a strong continuous network of metal matrix that is discontinuously filled with soft phase like hBN or hBN agglomerates. This is accomplished in an efficient manner by metal cladding hBN or hBN agglomerates and depositing them by plasma spray methods. The metal cladding results in efficient spray deposition and well distributed soft phase that is surrounded by an interconnected metal matrix. The interconnectivity of the matrix provides high strength and toughness for the relatively low volume fraction or metal. Target metal fraction is on the order of 10-36 V %. The low volume fraction of metal in combination with the hBN limits ductility of the smeared (mechanically alloyed) layer resulting in good abradability. The present coating structure and composition results in improved toughness, erosion resistance for a given metal content while maintaining abradability. The composition and structure provides low roughness and low gas permeability due to near fully dense coating structure. Roughness can be reduced due to the well distributed phases and low porosity compared with conventional coating composite structures. Accordingly, other embodiments are within the scope of the following claims.

What is claimed is:

1. A method of manufacturing a gas turbine engine air seal comprising:
    depositing an abradable coating onto a substrate, the abradable coating including cladding soft ceramic material particles with a metallic alloy, wherein the metallic alloy cladding comprises multiple discrete elemental layers and consolidating the clad soft ceramic material.

2. The method of manufacturing a gas turbine engine air seal of claim 1 further comprising:
    plasma spraying the abradable coating onto the substrate.

3. The method of manufacturing a gas turbine engine air seal of claim 1 wherein said depositing said abradable coating onto a substrate includes at least one of hot pressing said abradable coating directly onto the substrate, as a biscuit that is brazed on, glued, mechanically attached, attached by hot isostatic pressing, pressed and sintered, and sprayed directly onto the substrate.

4. The method of manufacturing a gas turbine engine air seal of claim 1, wherein said abradable coating further comprises at least one of additional metal matrix particles, fugitive pore formers, and additional soft phase material in a composite powder.

5. The method of manufacturing a gas turbine engine air seal of claim 4 further comprising:
    adjusting said abradable coating properties during manufacture to target the properties required for a predetermined gas turbine engine section environment.

6. The method of manufacturing a gas turbine engine air seal of claim 5 wherein adjusting further comprises adjusting a ratio of said clad hBN particles to at least one of said additional metal matrix particles, said fugitive pore formers, and said additional soft phase material in a composite powder.

7. The method of manufacturing a gas turbine engine air seal of claim 4 wherein said fugitive pore formers comprise a polyester particle.

8. The method of manufacturing a gas turbine engine air seal of claim 4 wherein said additional soft phase material comprises a bentonite agglomerated hBN.

* * * * *